United States Patent
Takahashi et al.

(10) Patent No.: US 6,876,523 B2
(45) Date of Patent: Apr. 5, 2005

(54) MAGNETIC HEAD, AND THE MAGNETIC READ-WRITE DEVICES, AND THE MAGNETIC MEMORY WITH MAGNETIC SENSORS

(75) Inventors: Hiromasa Takahashi, Hachioji (JP); Susumu Soeya, Kodaira (JP); Jun Hayakawa, Inagi (JP); Kenchi Ito, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 10/225,150

(22) Filed: Aug. 22, 2002

(65) Prior Publication Data

US 2003/0161079 A1 Aug. 28, 2003

(30) Foreign Application Priority Data

Feb. 27, 2002 (JP) ....................................... 2002-050665

(51) Int. Cl.[7] ................................................ G11B 5/39
(52) U.S. Cl. .................................................. 360/324.11
(58) Field of Search ...................... 360/324.11–324.12, 360/324.1–324.2, 327.31–327.32, 327.3, 324, 126; 29/603.13, 603.14; 428/677, 678

(56) References Cited

U.S. PATENT DOCUMENTS

| | | | |
|---|---|---|---|
| 6,205,008 B1 * | 3/2001 | Gijs et al. .................... | 360/324 |
| 6,608,738 B2 * | 8/2003 | Sakakima et al. ..... | 360/324.11 |
| 6,693,776 B2 * | 2/2004 | Gill ........................ | 360/324.12 |
| 6,714,444 B2 * | 3/2004 | Huai et al. .................. | 365/171 |
| 6,721,149 B1 * | 4/2004 | Shi et al. .................. | 360/324.2 |
| 6,747,301 B1 * | 6/2004 | Hiner et al. ................ | 257/295 |

FOREIGN PATENT DOCUMENTS

| | | |
|---|---|---|
| JP | 7-221363 | 8/1995 |
| JP | 11-509956 | 8/1999 |
| WO | WO97/44781 | 11/1997 |

* cited by examiner

Primary Examiner—Angel Castro
(74) Attorney, Agent, or Firm—Mattingly, Stanger, Malur & Brundidge, P.C.

(57) ABSTRACT

A magnetic head at high sensitivity and with enhanced output having a magnetoresistive element of high output and optimal for use in CPP-GMR, the magnetoresistive element comprising a pinned layer 606 containing a half-metal, a free layer 608 formed on one main surface of the pinned layer 606, a spacer 607 formed between the pinned layer 606 and the free layer 608, an anti-ferromagnetic layer 603 formed on the main surface of the pinned layer 606, a soft magnetic layer 604 formed between the pinned layer 606 and the anti-ferromagnetic layer 606, and a noble-metallic layer 605 formed between the pinned layer 606 and the soft magnetic layer.

18 Claims, 12 Drawing Sheets

609 : COVER LAYER
608 : FREE LAYER
607 : SPACER
606 : PINNED LAYER
605 : NOBLE METALLIC LAYER
604 : SOFT MAGNETIC LAYER
603 : ANTI FERROMAGNETIC LAYER

A PLANE FIGURE

A CROSS SECTIONAL FIGURE

MAGNETIC HEAD, AND THE MAGNETIC READ-WRITE DEVICES, AND THE MAGNETIC MEMORY WITH MAGNETIC SENSORS

BACKGROUND OF THE INVENTION

1. Field of the Invention

The present invention relates to a magnetic head having a magnetoresistive element and a magnetic read-write device, as well as a magnetic memory.

2. Description of Related Art

In magnetic read-write devices, recording density has been improved remarkably. Magnetic read-write heads equipped in the magnetic read-write devices are required to have high performance for both of reading and writing characteristics.

Performance of the reading head can be enhanced by an anisotropic magnetoresistive (AMR) head for the recording density of 1 to 10 (Gb/in$^2$) and by a giant magnetoresistive (GMR) head capable of attaining higher sensitivity for the recording density of 10 to 30 (Gb/in$^2$). In the recording density of 20 to 70 (Gb/in$^2$) at present, higher recording density of the writing head has been coped with by the advanced GMR effect referred to as specula GMR or NOL-GMR.

However, along with progress for further higher sensitivity, a writing system of higher sensitivity is required and it is considered that a tunnel magnetoresistive effect (TMR) will become predominant for the recording density of 70 to 150 (Gb/in2) and a GMR film (CPP-GMR: Current perpendicular to plane GMR) of flowing a detection current in the direction perpendicular to the film plane will become predominant for the higher recording density of 150 (Gb/in$^2$) or more. Since existent GMR element adopts a system of flowing the detection current parallel with the film plane, it is referred to as CIP-GMR and distinguished from CPP-GMR. An example of the CPP-GMR system magnetic head structure is disclosed in Japanese Translation of Unexamined PCT appln. No. 509956/1999 and JP-A No. 221363/1995.

However, since the magnetic resistance change coefficient in the existent CPP-GMR element is too small, it involves a problem that the element can not be applied to an actual writing head. Where electric current is flown in the direction along the thickness of the CPR-GMR film, the current path is shorter and the resistance value of the element is smaller compared with a case of flowing the current in the direction along the film plane of the CPP-GMR film.

The resistance of CPP-GMR manufactured so far is about 0.1 to 0.5 mΩ for an element of 0.25 $\mu m^2$ area. Further, since ΔR/R is about 20%, ΔR is 0.08 to 0.4 mΩ. It can be seen that the ΔR value is extremely small compared with an output value of 2 Ω or more required for application to the magnetic writing element.

The size of the CPP-GMR element may be made smaller for making the resistance R higher and ΔR greater but manufacture of the element area at present is limited to about 0.1 $\mu m^2$. Further, since the resistance value is too small when the element area is decreased, it results in a problem of making measurement of the resistance R difficult.

SUMMARY OF THE INVENTION

In view of the foregoing, it is the main object of this invention to provide a material for increasing the magnetic resistance change coefficient or electric resistance of an element and a magnetic head mounting a magnetoresistive element optimized for the film structure, as well as a magnetic read-write device.

More specifically, it is an object of this invention to provide a magnetic head and a magnetic read-write device which has a magnetoresistive element comprising;

a pinned layer containing a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer.

Also an object of the invention is to provide a magnetic head and a magnetic read-write device which has a magnetoresistive element comprising;

a first magnetic layer, a multi-layered magnetic film having a stacked ferri-structure, and a spacer formed between the first magnetic layer and the multi-layered magnetic layer, in which the multi-layered magnetic film has a second magnetic layer containing a half-metal and formed so as to be in contact with the spacer, a third magnetic layer containing a soft magnetic material, and a noble-metallic layer formed between the second magnetic layer and the third magnetic layer and, further, an anti-ferromagnetic layer is formed on the side of the third magnetic layer opposite to the side formed with the noble-metallic layer.

Also an object of the invention is to provide a magnetic head and a magnetic read-write device which has a magnetoresistive element comprising;

an anti-ferromagnetic layer, a first soft magnetic layer formed on the anti-ferromagnetic layer, a noble-metallic layer formed on the first soft magnetic layer, a half-metallic layer formed on the noble-metallic layer, a spacer formed on the half-metallic layer and a second soft magnetic layer formed on the spacer.

Since the magnetoresistive element constituted as described above has the pinned layer containing the half-metal, the second magnetic layer or the half-metallic layer, it has high magnetic resistance change coefficient or the electric resistance. Accordingly, a magnetic head of high sensitivity and large GMR output can be attained by mounting the magnetoresistive element. Further, the magnetic resistive element can also be mounted to a memory cell of a magnetic memory and can provide a magnetic memory in which the cell area can be decreased and the memory capacitance can be increased twice or more compared with usual memories.

Other and further objects, features and advantages of the invention will appear more fully from the following description.

BRIEF DESCRIPTION OF THE DRAWINGS

A preferred form of the present invention is illustrated in the accompanying drawings in which.

DETAILED DESCRIPTION OF PREFERRED EMBODIMENTS

A magnetic head to which the invention is preferably applied is to be explained in details.

The magnetic head according to this invention has a magnetoresistive element comprising a pinned layer containing a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer.

Particularly, the pinned layer contains at least one half-metal among materials in which a transition metal is added to $Fe_3O_4$, $CrO_2$ or ZnO and materials in which Mn is added to GaN. As described above, the magnetoresistive element according to this invention has a structure in which a material referred to as a half-metal is applied to the pinned layer.

Figure 1A:
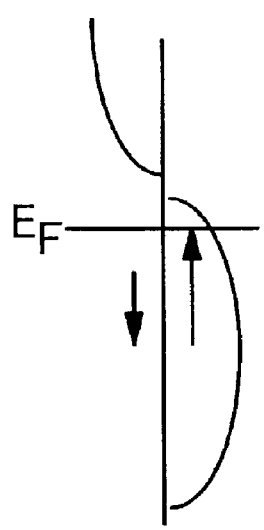
FIGS. 1A, 1B, 1C are schematic views showing the condition of the electron density (DOS) of a magnetic body.
Figure 1B:
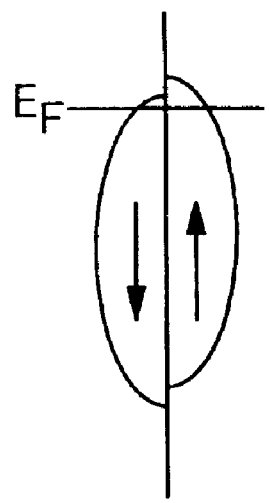
Figure 1C:
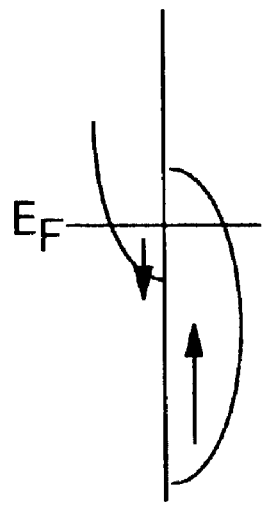

A half-metal has a characteristic structure of electron density state in the material as shown in FIGS. 1A, 1B, 1C. The structure of the electron density state is to be explained briefly. FIG. 1A shows the condition of the electron density of a half-metal magnetic body, FIG. 1B shows the condition of the electron density of a non-magnetic metal, and FIG. 1C shows the condition of the electron density of a magnetic metal.

Generally, the structure of the electron density state of the non-magnetic metal is in the form as shown in FIG. 1B. In the drawings the energy state is shown to change from lower to higher states upwardly and it is considered that the lateral direction of the drawing represents the electron density with the center being as zero. On the right and left with respect to the center of the drawing as the boundary, electrons are distinguished to have two kinds of electro spins. For the convenience, the right side is referred to up spin (↑) and the left side is referred to as down spin (↓).

In the drawings, the horizontal line indicated by EF represents an energy state called as Fermi surface and electrons at the energy contribute to substantial electric conduction. Since a metal has a finite electron density at the energy state of the Fermi surface, this constitutes electrons for electric conduction as free electrons. The half-metal is a substance in which electrons on the Fermi surface comprises either one of up and down spins as shown in FIGS. 1A, 1B, 1C.

The electron spin and the magnetism have a close concern to each other. The magnetic body has a feature that the total number of electrons in the band below the Fermi surface is greatly different between the up spin electrons and down spin electrons. On the other hand, the half-metal has a feature that the number of spins on the Fermi surface entirely comprises one-sided spins.

Accordingly, a material is sometimes both a half-metal and a ferromagnetic body. This is referred to as a half-metal magnetic body. However, since most of half-metals are magnetic bodies, they are referred to therein as the half-metal. One-sided of the spins is referred to as polarization P. The polarization P is represented by the following equation 1 with the number of up spin electrons as n↑ and the number of down spin electrons being as n↓ on the Fermi surface.

$$P=100\times(n\uparrow -n\downarrow)/(n\uparrow +n\downarrow)$$  Equation 1

When electrons are flown in the half-metal, electrons of the same spin component as the direction of electron spins in the half-metal are preserved and conducted in the half-metal, whereas electrons of the opposite spins are not conducted since repulsive force exerts. Accordingly, in a spin valve structure in which a half-metal magnetic body and a metal magnetic body are joined by way of a non-magnetic metal, when the magnetic metal is made soft magnetic, the magnetic resistance may possibly change greatly when the magnetization of the metal magnetic film is inverted by an external magnetic field. Since the resistance change coefficient is considered infinite, in principle, in such a spin valve structure in a case where the polarity of the half-metal magnetic body is 100%, when the spin-valve structure is formed of the material described above, it is considerably effective to the increase of the resistance change coefficient, that is, increase of the output.

Such half-metal magnetic body materials are generally classified into (A) magnetic semiconductor or (B) some of magnetic oxides. (A) the magnetic semiconductor is prepared from a diluted magnetic semiconductor (InMnAs, GaMnAs) formed by doping a magnetic body such as Mn to CrAs, CrSb or a III-V compound semiconductor having a zinc-blended type crystal structure by single crystal epitaxial growing by MBE.

Generally, half-metallic properties are shown in a low temperature region of 100K to 4K or lower while depending on the materials. Exceptionally, there are those showing such properties even at a high temperature, for example, CrSb (~350K) or CrAs (Tc>1000K). Further, magnetic semiconductors formed by doping transition elements to ZnO or GaN or like other magnetic semiconductors having the zinc-blend type crystal structure, exhibit ferromagnetic behavior at a room temperature and they are half-metals.

On the other hand, for magnetic oxides (B), $Fe_3O_4$ is particularly well known. In addition, $CrO_2$ is a candidate for the half-metal material. $Fe_3O_4$ is important since the half-metal properties can be obtained even at a room temperature and it has large magnetization and can provide soft magnetic property also as the magnetic body. However, since it is generally required for a high temperature treatment above 500° C. or film deposition on substrate temperature in order to obtain a single layer film, it has not yet been put to practical use.

In the half-metal oxide materials, there is a significant problem in view of the production temperature and generally it has not yet been conducted to manufacture devices or actual magnetic heads. $Fe_3O_4$ includes an $Fe_2O_3$ phase approximate thereto which is a stable phase but has low magnetization and is not a half-metal. This tends to cause phase mixing and also forms a mixture phase with Fe or $Fe_3O_4$. Since $CrO_2$ also tends to form phase mixing with an insulator of $Cr_2O_3$, it require a special production method such as in an oxygen atmosphere at high temperature.

For the problems described above, the present inventors have found that the growing energy can be controlled and a single layer can be formed by selecting an underlying material for $Fe_3O_4$ and found that a single layer can be formed by using a certain noble metal for such material.

The noble metal described above can include, for example, Pt and Rh. The noble-metallic film is formed on a substrate by an RF sputtering method, on which $Fe_2O_4$ is formed. In this method, when a film is formed at a substrate temperature of 300° C., it has been confirmed that the film is a single layer $Fe_3O_4$ in view of XRD pattern and saturation magnetization at a room temperature is 0.55 to 0.6 tesla which is identical with that of bulk $Fe_3O_4$ (saturation magnetization: 0.5–0.6 tesla at room temperature), and the temperature dependent abnormality of saturation magnetization near 120K (Verwey point) which is a feature of $Fe_3O_4$ has also been confirmed. The situation is substantially identical at a substrate temperature of 250° C. or higher. Even at a substrate temperature of 150 to 200° C., it shows saturation magnetization of 0.5 tesla or more. Accordingly, it is considered that the $Fe_2O_4$ single layer film can be formed by the method. Further, a film as thin as several nm can also be formed.

By the way, a pair of a metal magnetic films are stacked by way of a Cu spacer in the existent spin valve film. It is a subject of the magnetoresistive element according to this invention that whether a sufficient magnetoresistive property can be obtained as a structure in which the half-metal containing pinned layer and the metal magnetic layer are joined by way of the spacer.

Then, the present inventors have sandwiched a Cu or noble-metallic material as a spacer material for a magnetoresistive element in which an anti-ferromagnetic film, a soft magnetic film, a noble-metallic layer, a pinned layer containing a magnetic oxide, a spacer, and a free layer stacked in this order on a substrate and have studied as to whether the magnetoresistive property can be obtained or not. Further, for a magnetoresistive element in which a free layer, a spacer, a pinned layer containing magnetic oxide, a noble-metallic layer, a soft magnetic layer, and an anti-ferromagnetic film are stacked in this order on a substrate, since the material for the spacer has to serve also as the underlying layer described above, a noble metallic material is used. As a result, it has been confirmed that a sufficient magnetoresistive property can be obtained in any of the stacked structures described above.

Then, in a case of applying anti-ferromagnetic coupling applied in general GMR writing head as a method of fixing magnetization in a pinned layer containing a half-metallic material, the anti-ferromagnetic film used has to be formed on a metal magnetic film such as NiFe (soft magnetic film) as an under layer. However, in a case of stacking the soft magnetic film and the anti-ferromagnetic film in this order on the magnetic film comprising an half-metal oxide, oxygen diffuses from the pinned layer containing the half-metal oxide to the soft magnetic film to possibly degrade the half-metal property and oxidize to degrade the soft magnetic film thus possibly lowering the reliability.

In view of the above, the magnetoresistive element according to this invention has a structure in which the anti-ferromagnetic film and the pinned layer containing the half-metal oxide are joined by way of a stacked ferri-structure. With such a structure, since the spacer (noble metallic film) in the stacked ferri-structure functions as an antioxidant film, diffusion of oxygen from the pinned layer containing the half-metal oxide to the soft magnetic film can be suppressed reliably, thereby enabling to prepare highly reliable film. Also in this case, the stacked ferri-coupling is formed between the soft magnetic film and pinned layer containing the half-metal oxide which is a novel structure not known in the prior art.

EXAMPLES

[Experiment 1]

At first, a half-metal containing layer was formed on a substrate and then a noble-metallic layer was formed between the substrate and the half-metal containing layer and the following study was made for them.

Films were formed on substrates such as glass substrate, magnesium oxide substrate, GaAs substrate, AlTiC substrate, SiC substrate, $Al_2O_3$ substrate, and $SiO_2$ substrate. An RF sputtering was used for the film preparation method. The vacuum degree attained was $5 \times 10^{-3}$ Pa or lower and a target was a sintered target of $Fe_3O_4$. Films were grown in an Ar atmosphere at a pressure of 1 to 0.1 Pa and with a power of 50 W to 150 W. The film growing rate was less than 0.1 A/s. Alternatively, formation of $Fe_3O_4$ was confirmed in a case of forming the films at an extremely slow film forming rate of about 0.1 to 0.01 A/S also by using Fe as an evaporation source by a molecular beam epitaxially (MBE) method and using a method of introducing oxygen into the atmosphere while vapor depositing the source.

Where $Fe_2O_4$ was formed directly on the substrates described above, the saturation magnetization of the film formed at a room temperature was less than 0.1 tesla, and saturation magnetization at a substrate temperature of 400° C. was also from 0.2 telsa to 0.3 tesla. The value is low as that for the $Fe_3O_4$ single layer.

Further, the thus prepared film had intense tendency to an amorphous. In order to form the same into a substantially complete $Fe_3O_4$ single layer film, it is necessary to increase the substrate temperature to 540° C. or higher thereby promoting crystallization. However, by a novel preparing method of using the single crystal substrate described above, decreasing the $H_2O$ fraction in the sputtering chamber atmosphere and forming the film at a low rate and low energy, an $Fe_3O_4$ film having saturation magnetization of 0.4 tesla or more at a thickness of 10 to 50 nm could be prepared at a substrate temperature of 250° C. or higher.

It was confirmed that the temperature change of the magnetization of the film showed Verwey transition inherent to $Fe_3O_4$ near 120K and it was $Fe_3O_4$ in view of XRD diffraction peak. $Fe_3O_4$ is a material having a half-metallic property in view of theory and based on spectroscopic analysis in the past.

When the half-metal $Fe_3O_4$ is applied to the magnetoresistive element of a magnetic writing head, an electro-conducting film serving both as an electrode and an underlying layer is necessary below the element. Further, it was considered that there is high possibility capable of lowering the growing temperature by properly selecting the underlying layer. Then, films of noble metals, that is, Pt, Pd, Rh, Ru, Ir, Au, and Ag were formed each at a thickness of 2 nm on the substrates described above. An $Fe_3O_4$ film was grown to a thickness of 50 nm on the film by the preparing method described previously and the temperature dependence of the magnetic property was examined.

Figure 2:
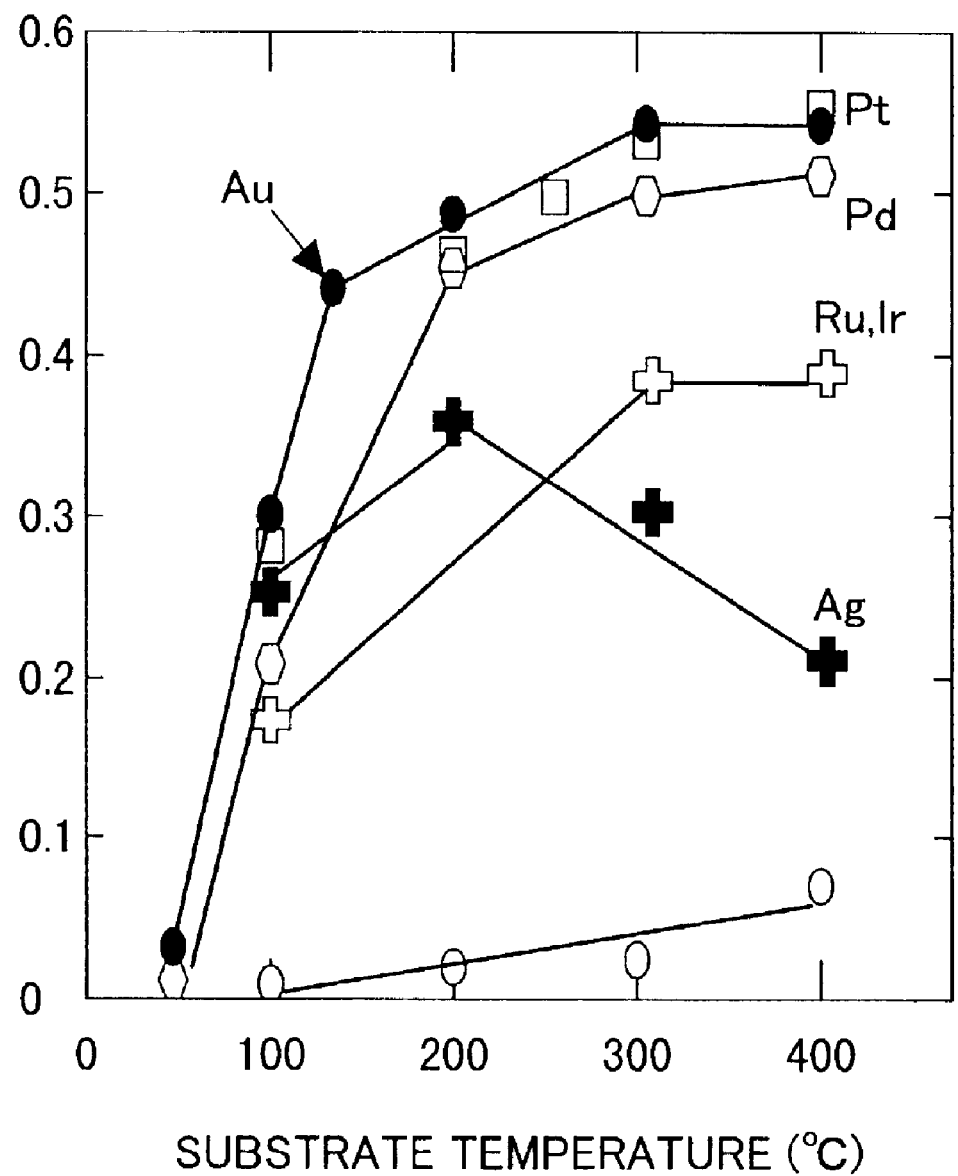
FIG. 2 is a characteristic graph showing the dependence of the saturation magnetization in an $Fe_2O_4$ film on the substrate temperature.
Figure 3:
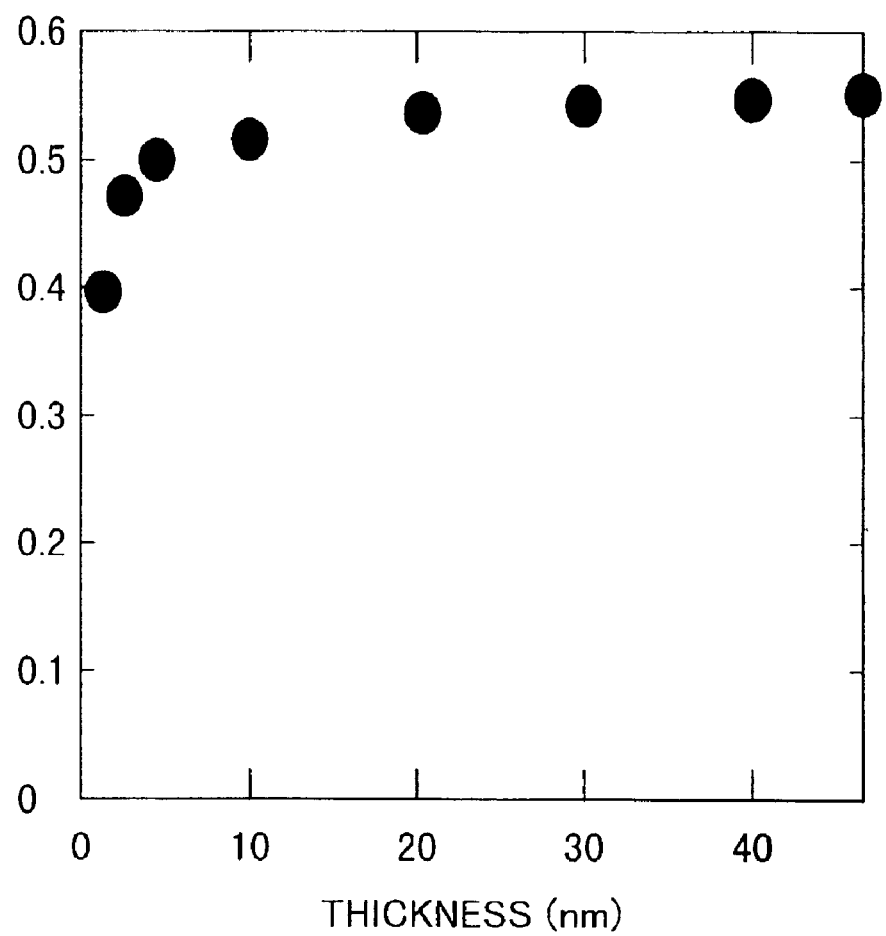
FIG. 3 is a characteristic graph showing the dependence of saturation magnetization of an $Fe_2O_4$ film formed on a noble-metallic film (Au) on the film thickness.

FIG. 2 shows the dependence of saturation magnetization Bs of the thus formed $Fe_2O_4$ film on the substrate temperature for each of the noble-metallic underlying materials. From the result, substantially preferred growing of $Fe_2O_4$ was confirmed in a case of using Pt, Pd, Rh, Ru, Ir, Au, or Ag as the underlying layer rather than the case of directly forming the $Fe_3O_4$ film on the glass substrate. Particularly, in a case of applying the Au, Pd or Pt underlying layer, about 0.5 tesla of saturation magnetization was obtained for the $Fe_3O_4$ film even at a substrate temperature of 200° C. Further, the coercive force of the film was about 1 A/m and this is a satisfactory soft magnetic film.

Further, when the thickness of the underlying noble-metallic films was 50 nm to 100 nm, it was confirmed that similar values can also be obtained by making the surface roughness Ra to 0.4 nm or less. Further, when an appropriate underlying layer such as Cr was interposed to a thickness from several nm to several tens nm below the noble metal, the surface structure of the noble-metallic film grown thereon was smoothed to promote the growth of the $Fe_2O_4$ film.

For application to a writing head, it is necessary that the properties described above are exhibited at a thickness of the half-metal film up to about 1 nm. The subject in forming the thin film resides in that the direction of magnetization is varied to result in a super-paramagnetic property when the thickness of the film is reduced since the energy of temperature becomes higher than the magnetic energy of magnetization spins of magnetic particles constituting the film. Therefore, it is necessary that the film thickness is larger than that of so-called super-paramagnetic limit.

Figure 4:
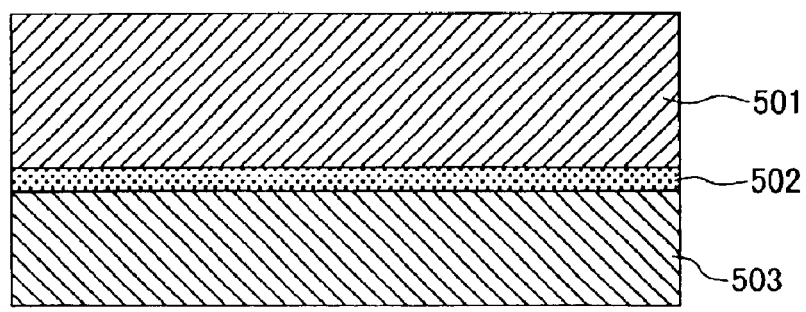
FIG. 4 is a cross sectional view of a spin valve type GMR element.

FIG. 4 shows the dependence of saturation magnetization on the film thickness. As shown in the graph, while the saturation magnetization of the film tends to decrease abruptly as the thickness of the film is reduced but magnetization is insured at about 1 nm. In view of the graph, while the saturation magnetization of the $Fe_3O_4$ film was about 0.5 tesla in a region where the thickness of the $Fe_3O_4$ film exceeded 10 nm, it was slightly decreased to about 0.4 tesla at a film thickness of less than 0.8 nm, but it is considered that the ferromagnetic property as magnetite is maintained. At less thickness, since the change of the property depending on the thickness is abrupt, it is not suitable as the structural material for the magnetic writing head.

Also for $CrO_2$, ZnO and GaN as the half-metal oxide other than $Fe_3O_4$, when an underlying noble-metallic film was formed and the material was grown thereon as in the case of $Fe_3O_4$, it was confirmed that the single layer film was formed even at a substrate temperature of 250° C. ZnO is transformed into a state of a ferromagnetic half-metal when doped with about 25% of ferromagnetic metal such as V, Cr, Fe, Co or Ni. Further, also GaN is transformed into a ferromagnetic half-metal when doped with 25% of Mn. Formation on the underlying noble-metallic film is effective also for the materials described above.

Then, in an existent magnetoresistive element in which a GMR spacer is formed between a free layer and a pinned layer, use of a noble-metallic material as the spacer was studied as described below.

The existent spin valve type GMR element usually has a structure in which a GMR spacer 502 is formed between a free layer 503 and a pinned layer 501 as shown in FIG. 4.

For the free layer 503 and the pinned layer 501, a metal magnetic material having soft magnetic property such as NiFe or CoFe is used respectively. While a coercive force difference type GMR element utilizing the difference of coercive force between the pinned layer 501 and the free layer 503 is also known, a generally used type is a so-called spin valve type in which an anti-ferromagnetic film such as MnPt is further present in contact with the pinned layer 501 to fix magnetization by exchange coupling magnetic fields.

For further reducing the thickness of the pinned layer 501, it is sometimes adopted a film structure in which an Ru film, a metal soft magnetic film and an anti-ferromagnetic film are stacked to the surface of the pinned layer 501 on the side opposite to the side in contact with the spacer 502. In the stacked structure of magnetic metal film (pinned layer)/Ru film/magnetic metal film (metal soft magnetic film), the pinned layer and the metal soft magnetic film are anti-ferromagnetically coupled by controlling the thickness of the Ru film. The stacked structure is a general structure referred to as a stacked ferri-structure.

Further, the material constituting the GMR spacer 502 comprises Cu or Cr commonly in most of such cases.

Figure 5:
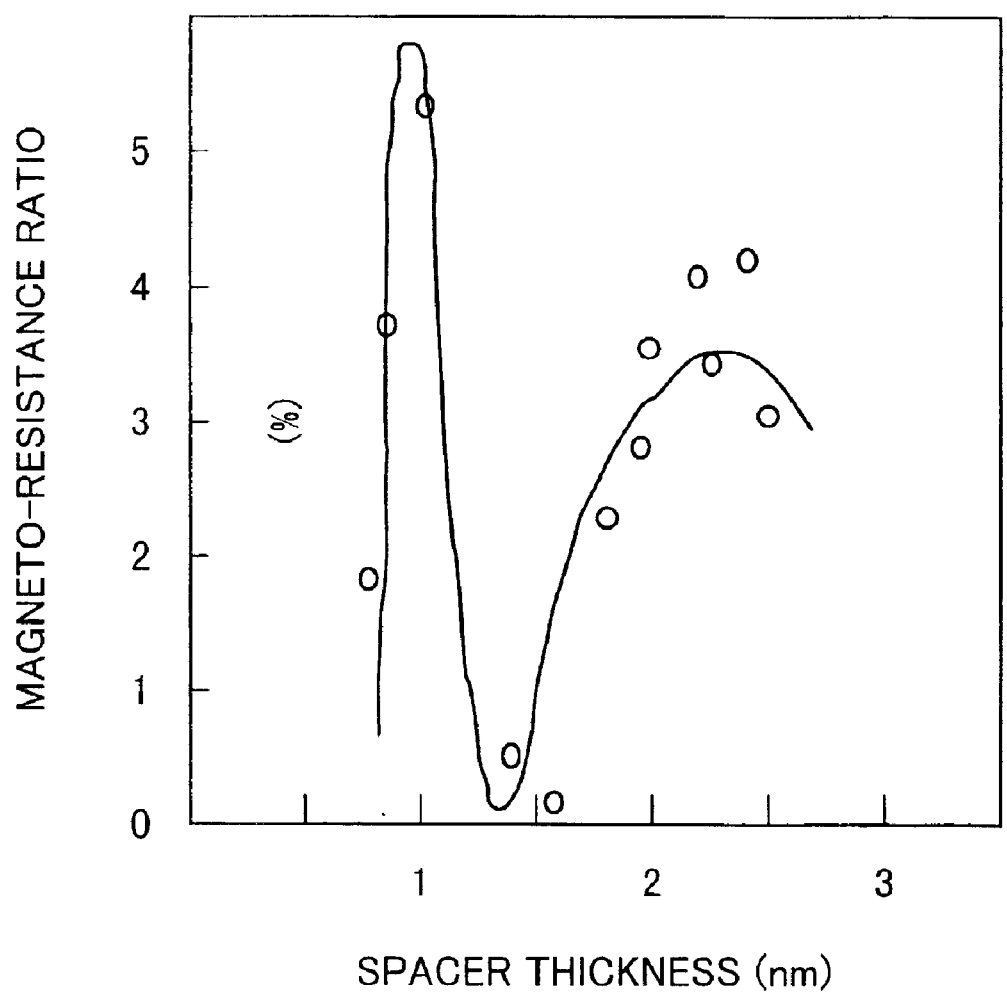
FIG. 5 is a characteristic graph showing a relation between the film thickness and the resistance change coefficient of a GMR spacer containing a noble metal.

It was studied for the case of using not Cu but a noble-metallic material such as Pt, Pd, Rh, Ru, Ir, Au or Ag as the material for the GMR spacer 502. Then, when the dependence of the resistance change coefficient on the thickness of the GMR spacer 502 in the case of flowing current along the film plane was examined for a magnetoresistive element formed by stacking CoFe (3 nm)/GMR spacer (X nm)/CoFe (5 nm)/NiFe (2 nm)/MnIr (12 nm) films in this order, an oscillation phenomenon of the resistance change coefficient depending on the thickness of GMR spacer was confirmed as shown in FIG. 5. Further, when GMR property was examined on the film with 2 nm GMR spacer, while the resistance change coefficient varied depending on the material for the GMR spacer, it showed a finite resistance change coefficient in a range from 0.3 to 10% within the plane of film using a noble-metallic material such as Pt, Pd, Rh, Ir, Au or Ag. From the foregoings, it has been found that the spin valve can be formed also by way of a spacer containing not Cu but a noble metal.

From the foregoings, it has been found that GMR (Giant Magnetoresistive Effect) occurs also in a case of using the noble-metallic material for the spacer in the magnetoresistive element. Further, it has been found that while ΔR/R was about 2 to 4% in the film of the similar structure using Cu as the spacer, ΔR/R equal with or more than that in the case of using the Cu spacer can be obtained by using the noble-metallic spacer.

Example 1

Then, the magnetoresistive element according to this invention is to be described.

At first, a stacked film comprising CoFe (3 nm)/GMR spacer (X nm)/$Fe_3O_4$ (50 nm)/noble-metallic film (10 nm) was prepared in order to examine the property of a spin valve element using a spacer containing a noble metal in a GMR structure film having a magnetic oxide film (pinned layer) containing an magnetic oxide material (half-metal) and a free layer containing a metal magnetic material. When the dependence of the resistance change coefficient on the thickness of the GMR spacer upon flowing a current along a film plane was examined, it showed a resistance change coefficient of about 0.3 to 1.0% at a room temperature. The value is small because this is a magnetic resistance within a plane for a film having a large resistance of half-metal portion, and the oscillation phenomenon for the resistance change coefficient depending on the thickness of the GMR intermediate layer inherent to GMR was confirmed.

Figure 6:
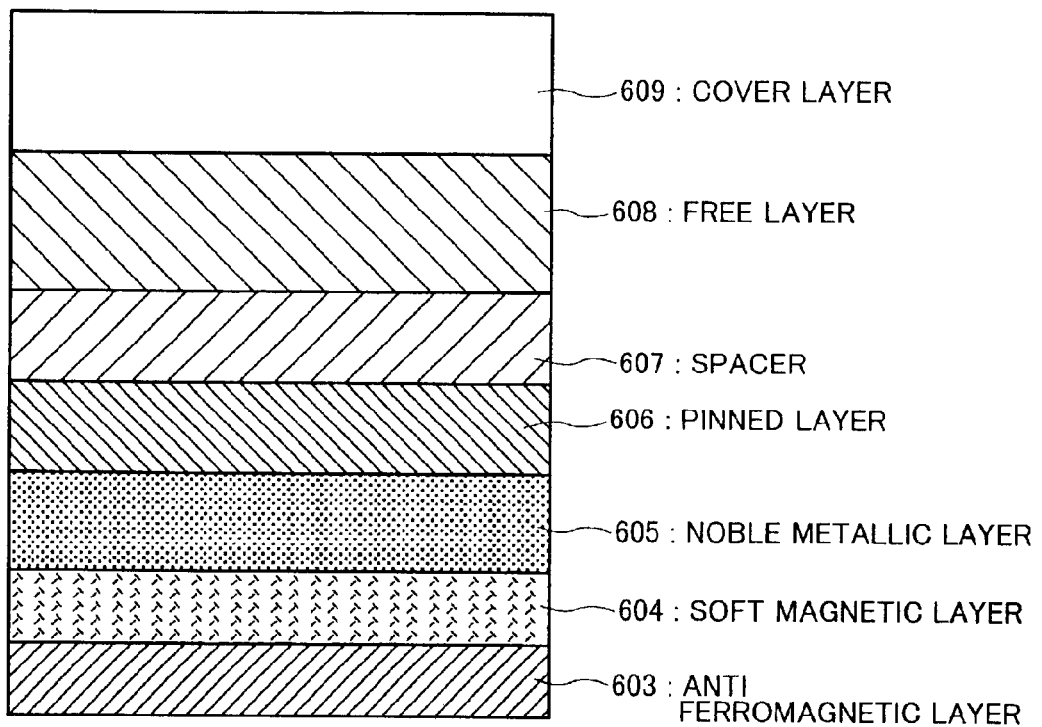
FIG. 6 is a schematic view of a magnetoresistive element according to the invention.

Then, description is to be made for GMR in a case of adopting the CPP structure. FIG. 6 shows a structure in which an anti-ferromagnetic film (AF film) 603 is formed on the side where the spacer 607 is opposed to a substrate (not illustrated). As an example, when a structure formed by successively stacking Co—Fe containing free layer 608 (3 nm thickness)/GMR spacer 607 (2 nm thickness)/$Fe_3O_4$-containing pinned layer 606/noble-metallic layer 605/NiFe-containing soft magnetic film 604/MnIr-containing anti-ferromagnetic film 603 (12 nm thickness)/Cr-containing underlayer/substrate was actual manufactured, it was found that the MR ratio of the films was different depending on the material constituting the noble metallic layer 605 and it ranged from 0.2 to 10% for Pt, Pd, Rh, Ru, Ir, Au and Ag, respectively.

It was confirmed that anti-ferromagnetic coupling referred to as a stacked ferri-structure was formed in a structure of: pinned layer 606 containing magnetic oxide ($Fe_3O_4$)/Ru-containing noble-metallic layer 605/soft magnetic film 605 containing metal magnetic material (NiFe) at a film thickness of about 1.2 nm, for example, in a case of using Ru. From the foregoings, it was found that a magnetoresistive film of high magnetic resistance change coefficient as an output of a CPP-GMR structure can be obtained in the structure shown in FIG. 6. Further, this is a structure which is effective also to a magnetoresistive film of using a half-metal magnetic oxide film other than $Fe_3O_4$ as a pinned layer.

Regarding the structure, the magnetic metal used for the free layer 608 and the soft magnetic layer 604 is a soft magnetic metal material typically represented by $Ni_{80}Fe_{20}$ or $Co_{90}Fe_{10}$ in addition to those mentioned as the examples. Further, for the half-metal magnetic film 606 of the pinned layer, magnetic resistance of several % or more can be obtained also by using $CrO_2$, ZnO-M (M: transition metal), GaN-M (M: transition metal), CrAs, MnSb in addition to $Fe_3O_4$. Further, in a case of using MnPt, CrMnPt, NiO, etc, in addition to MnIr, as the anti-ferromagnetic film 603, it can operate satisfactorily also as a writing element structure capable of obtaining resistance change, although a heat treatment at 250° C. to 300° C. is necessary.

Figure 7:
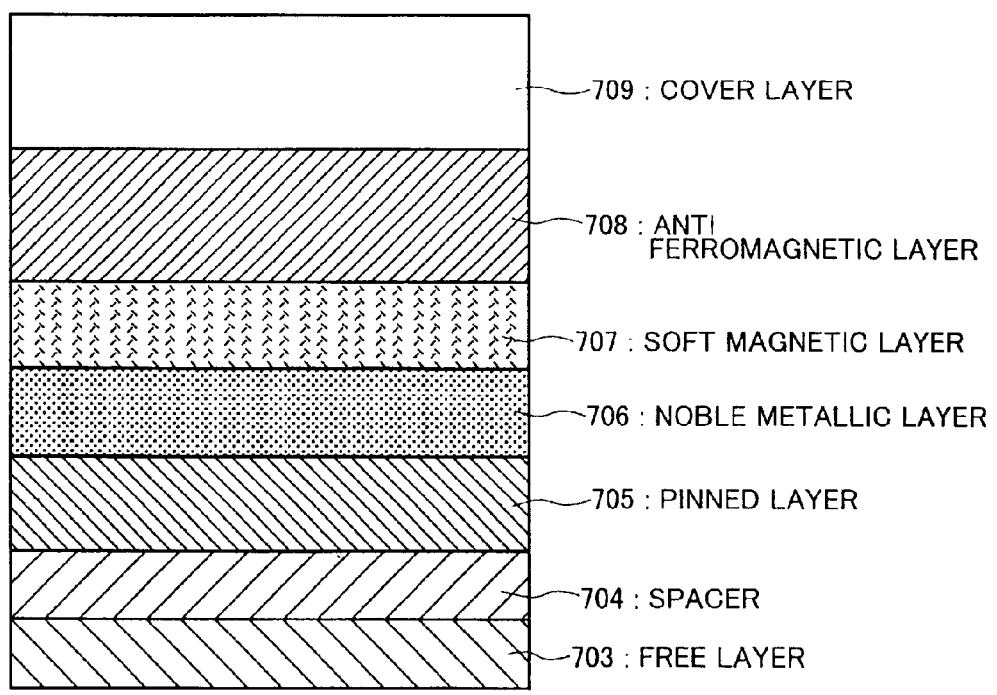
FIG. 7 is a schematic view of a magnetoresistive element according to the invention.

On the other hand, FIG. 7 shows a structure in which an anti-ferromagnetic film 603 is disposed where to a spacer 607 on the side not opposed to a substrate (not illustrated) As an example of this structure, a film formed by successively stacking Ta-containing protective film 709/MnPt-containing anti-ferromagnetic film 708 (12 nm)/NiFe-containing soft magnetic film 707/noble-metallic layer 706/$Fe_3O_4$ pinned layer 705/GMR spacer 704/CoFe-containing free layer 703/Cr-containing underlayer 702/substrate 701 film. It was found that similar magnetoresistive property can be obtained also for them. Details for each of the constituent elements are identical with those described previously.

Then, the oxidation preventive function of the noble-metallic spacers 605 and 706 is to be described. It has been known that when a metal magnetic material is in direct contact with the magnetic oxide constituting the pinned layer 606 or 705, oxygen atoms in the oxide are bonded through the junction boundary with atoms on the side of the metal material and diffuse into the metal film. This tendency is particularly promoted, for example, due to the heat treatment process at about 200° C. for preparing a writing head. In order to effectively prevent this, it is effective to sandwich the pinned layer 606, 705 containing magnetic oxide between noble-metallic atoms that are less bonded with oxygen.

In the structure shown in FIG. 6 or FIG. 7, both sides of the pinned layer 606, 705 containing magnetic oxide (half-metal) are sandwiched between the spacer 607, 704 containing a noble metal and the noble-metallic layer 605, 706. When the boundary is measured by X-ray photoelectron spectroscopy (XPS) or Rutherford backward scattering (RBS), oxygen is reduced at the boundary with the metal, whereas it substantially constitutes a stoichiometrical ratio at the boundary with noble metal regarding oxygen and iron ratio at the oxide boundary. It is accordingly considered that oxygen diffusion can be prevented.

Example 2

The film shown in FIG. 6 or FIG. 7 is applied as a magnetoresistive element of a CPP-GMR structure. The basic properties required for the CPP-GMR film includes the following three points.

(a) Surface resistance of film of 2 $\Omega\mu m^2$ or less, preferably, 1 $\Omega\mu m^2$ or less (while varying depending on the element area)
(b) Magnetic resistance change coefficient of 2% or higher
(c) Coercive force of magnetic material For the area resistance (a), it will be anticipated a problem different from a material of low resistance in a case of using a magnetic oxide such as $Fe_3O_4$ for the half-metal in the element. Assuming a basic structure of noble-metallic layer 605, 706/half-metal oxide-containing pinned layer 605, 705/noble metal-containing spacer 607, 704/magnetic material-containing free layer 608, 703, the change of the area resistance when the thickness of $Fe_3O_4$ layer is changed for Pt (10 nm thickness)/$Fe_3O_4$/Au (3 nm thickness)/NiFe (5 nm thickness) is calculated for an element sized 120 nm×120 nm. The resistivity of $Fe_3O_4$ is 3500 $\mu\Omega cm$ (vertical) to 3500 $\mu\Omega cm$ (within plane) and resistivity of other materials is 30 $\mu\Omega cm$ for Pt, 2 $\mu\Omega cm$ for Au and 30 $\mu\Omega cm$ for NiFe.

At a film thickness of $Fe_3O_4$ of 30 nm, assuming the resistivity of $Fe_3O_4$ as 3500 $\mu\Omega cm$, the element resistance is about 73 $\Omega$ and RA is 1.05 $\Omega\mu m^2$. Further, at a thickness of $Fe_3O_4$ film 10 nm, the element resistance is 25 $\Omega$ and RA is 0.35 $\Omega\mu m^2$. At a thickness of $Fe_3O_4$ film of 1.5 nm, the element resistance is about 3.7 $\Omega$ and RA is 0.053 $\Omega\mu m^2$. The magnetoresistive effect change coefficient varies depending on the thickness of $Fe_3O_4$ film. This is because the magnetic disturbance of $Fe_3O_4$ includes MR effect of $Fe_3O_4$ per se and boundary diffusion between the $Fe_3O_4$ film and the spacer. Since the latter contributes to the GMR property, the GMR effect increases when the thickness of $Fe_3O_4$ is thin.

GMR component is about 0.2 to 0.5% at a thickness of $Fe_3O_4$ of 40 nm, it is 1% to 5% for 10 nm and 3 to 10% for 5 nm. For an element size 0.1×0.1 $\mu m^2$, R is 5.3 $\Omega$ and $\Delta R$=1.5 to 5.3 $\Omega$.

When CPP-GMR property is considered as a specification for the writing-head corresponding to the recording density of 140 Gb/in$^2$, the area resistance takes a value of 1 $\Omega\mu m^2$ or less at a film thickness of $Fe_3O_4$ of 30 nm or less. In a case of an element area of 250 nm×250 nm, the element resistance is about 18 $\Omega$ at a film thickness of $Fe_3O_4$ of 30 nm. At a film thickness of $Fe_3O_4$ of 50 nm, RA is 1.75 $\Omega\mu m^2$ and the element resistance is about 30 $\Omega$. Actually, since the resistivity of $Fe_3O_4$ varies depending on the preparation method, the resistance fluctuate for one digit at the maximum. However, also in such a case, it is sufficiently possible to prepare a magnetoresistive film for making the element resistance to about 20 to 100 Ω by controlling the element area or film thickness.

On the contrary, in the magnetoresistive element of an existent structure, specifically, in the film of stacked structure of Ta (1 nm)/NiFe (3 nm)/MnPt (15 nm)/CoFe (3.5 nm)/Cu (3 nm)/CoFe (3 nm)/Ta (1 nm), even when the element area is decreased to 0.1×0.1 $\mu m^2$, R=about 0.5 Ω and the output ΔR is about 0.01 Ω even at ΔR/R of 2%, which is smaller compared with the invention described above.

Further, the magnetic resistance change coefficient in a magnetoresistive element according to this invention, that is, a magnetoresistive element having a pinned layer containing half-metal magnetic material is 13% at room temperature in a TMR structure having a $Co/Al_2O_3/Fe_3O_4$ structure and the resistance change coefficient is 6% or more also in $CoFe/Pt/Fe_3O_4$ and NiFe/Au/Fe 304. The coercive force of $Fe_3O_4$ is about 1 A/m in the direction of the hard axis of single crystals and satisfactory soft magnetic property can be obtained.

Example 3

An example of applying this invention to a magnetic head is shown below. The CPP-GMR film for use in the magnetoresistive element is a film having a structure as shown in FIG. 6 or FIG. 7 and, for example, it has a structure shown in Example 2. The magnetic head structure using the magnetoresistive element described above may be considered to be applied both to a structure referred to as an in-gap type and a head structure referred to as a yoke structure.

The in-gap structure is a head structure of a shape in which a magnetic sensor film is put between a pair of shields and a cross section is exposed to the surface opposed to a recording medium. Further, the yoke structure is such a structure in which a sensor is not exposed to the medium-opposed surface but a sensor is disposed to the bottom of a yoke film comprising a soft magnetic material, for example, in an alphabetical C-shaped structure. It is considered that they constitute a structure in which the electrode serves both as the shield and having a magnetic domain control mechanism. However, in a case where the element size is sufficiently small, magnetic walls are not sometimes formed in the element in which the magnetic domain control in this structure may be no more required sometimes.

Figure 8:
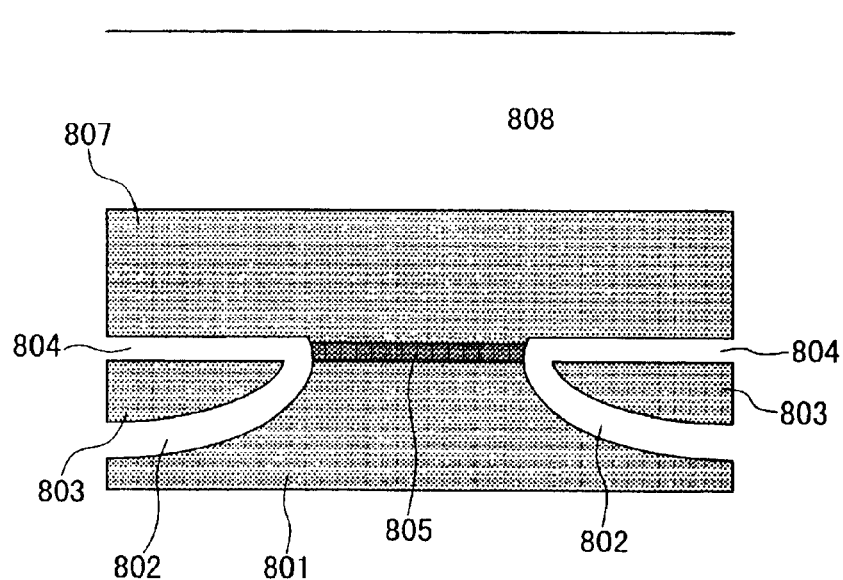
FIG. 8 is a cross sectional view of an in-gap type CPP-GMR writing head according to the invention as viewed from the side opposing to a medium.

FIG. 8 is a view of a writing head of an in-gap shape in which the electrode also serves as the shield, as viewed from the medium-opposing surface. For example, a lift-off material is coated on a lower shield electrode film surface 801 and, after forming a lift off pattern in a shape leaving a place 805 as a magnetic sensing part after forming the film, a magnetoresistive film 805 is etched by a method such as an ion milling method. After etching, a film formed by sandwiching a magnetic domain control film 803 made of a hard magnetic material such as CoCrPt, $CoCrPtZrO_2$ between insulative films 802 and 804 is formed. Since the magnetic domain control film prevents noises of the CPP GMR sensor film due to magnetic domain behavior, magnetic field measuring accuracy can be improved. In this case, when the magnetic domain control film 803 is formed on an appropriate underlayer such as of Cr or Ta, it is sometimes effective regarding the property of the magnetic domain control film. However, in a case where the element size is sufficiently small, magnetic walls are not formed sometimes in the element, in which the magnetic domain control in this structure is not sometimes required.

After forming the magnetic domain control films 803, 804, the lift off mask was removed. Subsequently, an upper shield film electrode 807 is formed. Then, a mixed film, for example of $Al_2O_3$ and $SiO_2$ was formed thereon as a thick protective insulation film 808 to a thickness of 100 nm or more.

Figure 9:
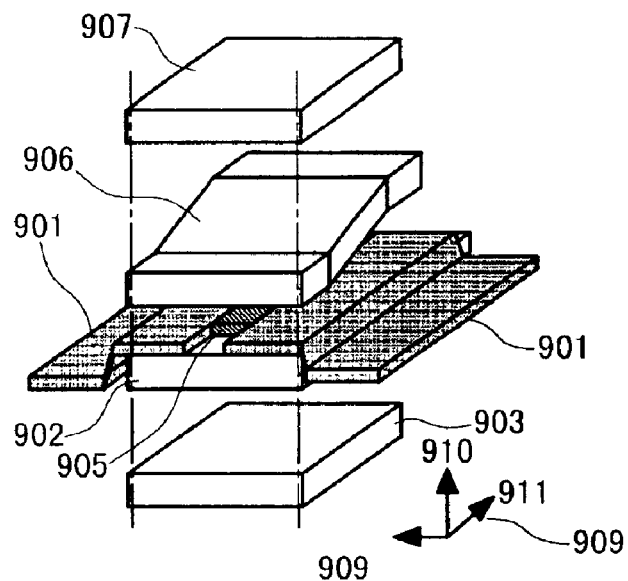
FIG. 9 is a schematic view of a yoke structure according to the invention.
Figure 10:
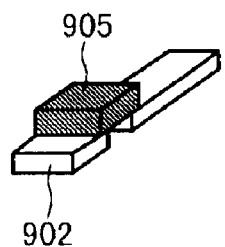
FIG. 10 is a schematic view showing a positional relation between a magnetoresistive element and a yoke according to the invention.
Figure 11:
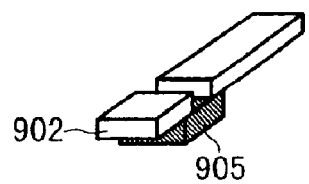
FIG. 11 is a schematic view showing a positional relation between a magnetoresistive element and a yoke according to the invention.

Further, FIG. 9 is a perspective view schematically showing a typical yoke structure and a magnetic domain control film. Numeral 909 represents each direction in the drawing in which 910 represents the direction along the thickness of the film, 911 represents the direction along the height of the element and 909 represents the direction of a track width. This embodiment adopts a structure in which a magnetoresistive sensor film 905 is not exposed to the surface opposing to a medium. It was confirmed a structure in which yoke films 906 and 902 made of soft magnetic material are put in a gap sandwiched between a lower magnetic shield 903 and an upper magnetic shield 907 made of $Ni_{81}Fe_{19}$ shown in the drawing. The yoke films 906 and 902 are in a C-ring configuration in which the upper yoke 906 and lower yoke 902 are joined. In addition, there are also such structures that the lower yoke 906 is restricted at the top end near the medium surface in the direction of the track width, the thickness of the yoke film is increased or the yoke is made discontinuous below a magnetic sensor (FIGS. 10, 11). In the drawing, a magnetic domain control film 901 is shown. In this structure, at least the lower yoke 902 and the magnetoresistive sensor film is put to magnetic domain control and there is no peripheral current leakage. It was confirmed for the structure of the magnetic domain control film that either the structure of conducting magnetic domain control for the upper and lower films and the magnetoresistive sensor film simultaneously or the structure of conducting magnetic domain control respectively can provide satisfactory magnetic domain control.

In FIG. 9, even a structure in which a portion of the yoke in contact with the magnetic sensor film is made discontinuous in order to increase the amount of magnetic flux sensed by the magnetoresistive sensor can form the magnetic domain control film by using a high resistive film for the material of the magnetic domain control film. Such magnetic field sensors can effectively utilize magnetic fields from the medium at a good efficiency since the permeability of the sensor film is increased by about 1000 times compared with a case of using semiconductor as the sensor film.

In this structure, since the magnetic field to be sensed is a component applied perpendicular to the film surface, it has a structure of sensing leakage magnetic field of recording from magnetic recording or leakage magnetic flux at the recording end of in-plane recording.

In this embodiment of using the magnetoresistive sensor described above, degradation of the writing characteristic due to electric contact of the magnetic resistance change film and the magnetic domain control film was not recognized even at a writing shield gap (inter-gap distance) of 80 nm or less.

Figure 12:
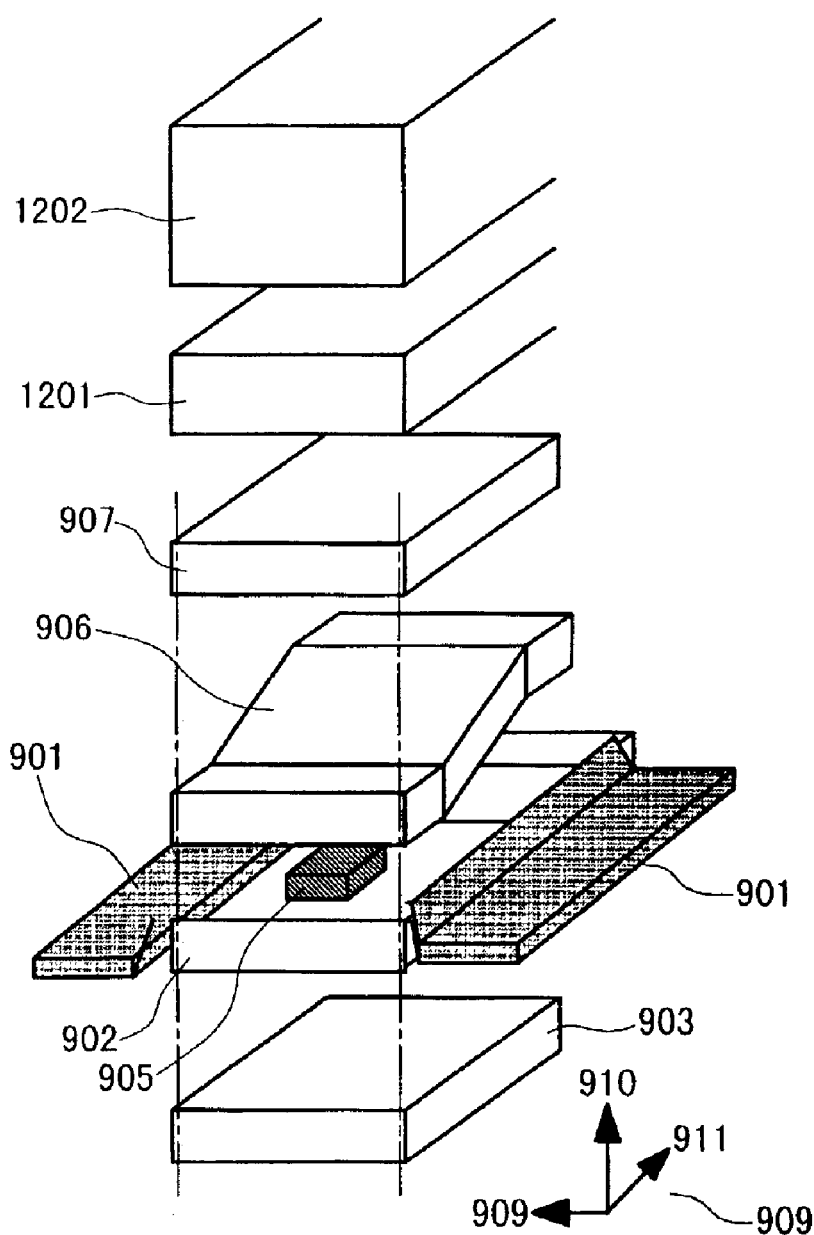
FIG. 12 is a schematic view showing a positional relation between a magnetoresistive element and a yoke according to the invention.

Further, in addition to the writing head structure shown here, it was confirmed that both reading and writing could be conducted with no troubles also in a head as shown in FIG. 12 in which an insulative film 1201 is formed on the upper magnetic shield 907, on which a recording head mechanism 1202 is mounted.

Example 4

Figure 13:
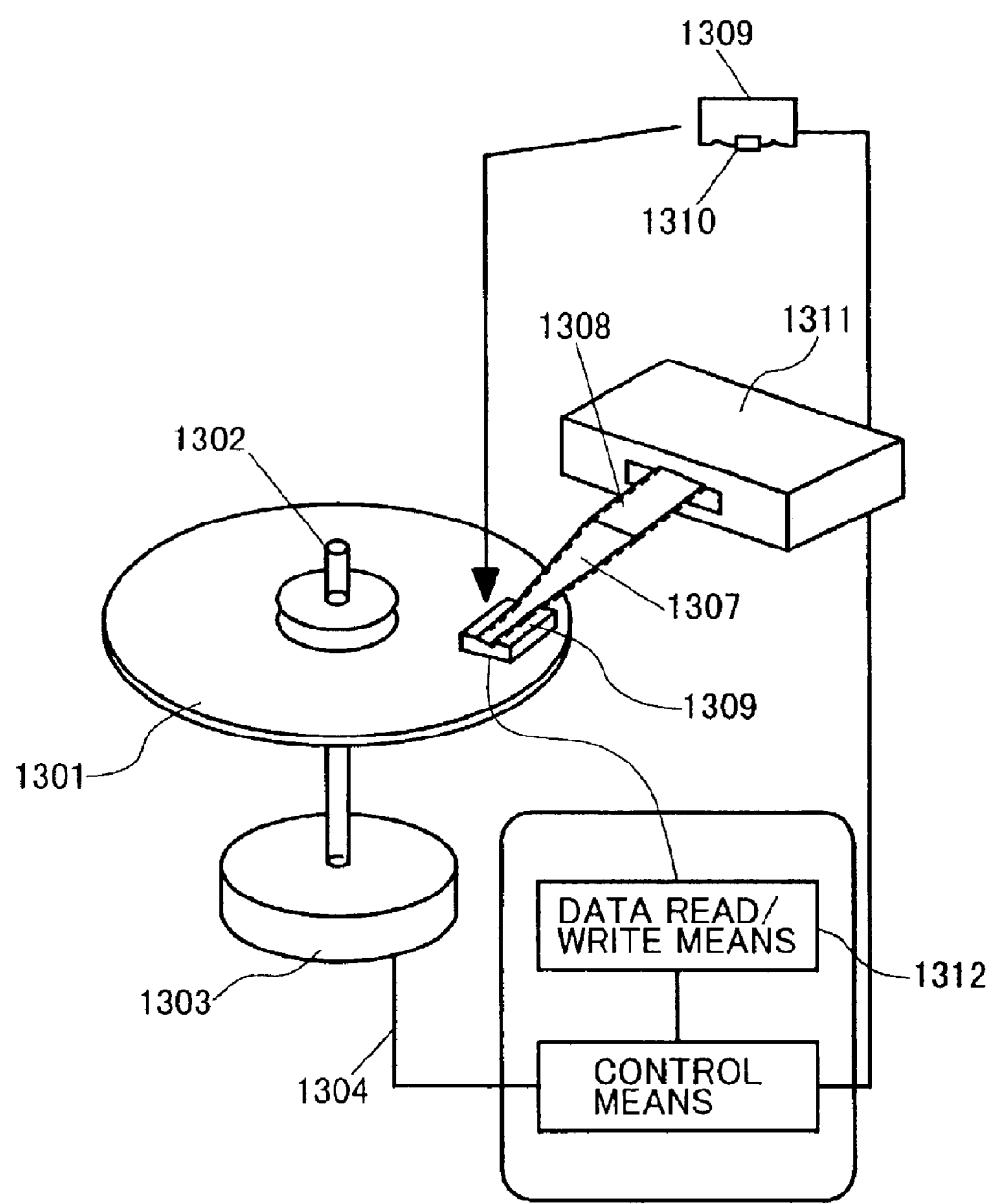
FIG. 13 is a schematic view of a magnetic read-write device according to this invention.

FIG. 13 is a view showing a magnetic disk apparatus as an example using a head according to this invention. The illustrated magnetic disk apparatus comprises a disk-shaped magnetic recording medium 1301 as a magnetic recording medium for recording data in concentrical recording regions called as tracks, a magnetic head 1306 according to this invention comprising a magnetic transducer for conducting the data reading and writing, an actuator 1311 for supporting the magnetic head 1306 and moving the same to a predetermined position on the magnetic disk 1301 and a control system for controlling sending and receiving of data read and written by a magnetic head and movement of the actuator.

Further, the constitution and the operation are to be explained below. At least one rotational magnetic disk 1301 is supported by an axis 1302 and rotated by a drive motor 1303. At least one slider 1306 is disposed on the magnetic disk 1301. The slider 1309 is disposed by one or more and supports the magnetic head 1310 according to this invention for reading and writing.

The slider 1309 is moved on the disk surface along with the rotation of the magnetic disk 1301 and caused to access to a predetermined position in which an aimed data is recorded. The slider 1309 is attached by a suspension 1307 to an arm 1308. The suspension 1307 has a slight resiliency to bring the slider 1309 into intimate contact with the magnetic disk 1301. The arm 1308 is attached to the actuator 1311.

The actuator 1311 includes a voice coil motor (hereinafter simply referred to as VCM). VCM comprises a movable coil placed in a fixed magnetic field, and the moving direction and the moving speed of the coil are controlled by electric signals given from the control system 1312 by way of a line 1304. Accordingly, the actuator in this embodiment comprises, for example, the slider 1309, the suspension arm 1307, the arm 1308, the actuator 1311 and the line 1304.

During operation of the magnetic disk, an air bearing is formed due to an air flow between the slider 1309 and the disk surface by the rotation of the magnetic disk 1301, which raises the slider 1309 above the surface of the magnetic disk 1301. Accordingly, during operation of the magnetic disk apparatus, the air bearing is balanced with the slight resiliency of the suspension 1307 and the slider 1309 is kept so as to rise not in contact with the magnetic disk surface but keeping a predetermined distance from the magnetic disk 1301.

Usually, the control system 1312 comprises, for example, a logic circuit, a memory and a microprocessor. Then, the control system 1312 sends and receives control signals by way of each lines and controls various constitution means of the magnetic disk apparatus. For example, the motor 1303 is driven by a motor driving signal transmitted by way of the line 1304.

The actuator 1311 is controlled so as to optimally move and position the slider 1309 selected to the aimed data track on the relevant magnetic disk 1301.

Then, the control system receives electric signals read and converted from the data of the magnetic disk 1301 by the magnetic head 1310 by way of the line 1304 and interprets the same. Further, it sends electric signals for reading as data to the magnetic disk 1301 by way of the line 1304 to the magnetic head 1310. That is, the control system 1312 controls sending and reception of information that is read or written by the magnetic head 1310.

The reading and writing signals may also be transmitted directly from the magnetic head 1310. Further, the control signals can include, for example, access control signals and clock signals. Further, the magnetic disk apparatus may have plural magnetic disks or actuators and the actuator may have plural magnetic heads.

By the provision of such plural mechanisms, a so-called disk array apparatus may be formed.

Since the magnetic recording apparatus constituted as described above has the magnetoresistive element according to this invention mounted therein, it can conduct magnetic reading/writing in a region where the writing density exceeds 150 Gb/in$^2$.

Example 5

Figure 14:
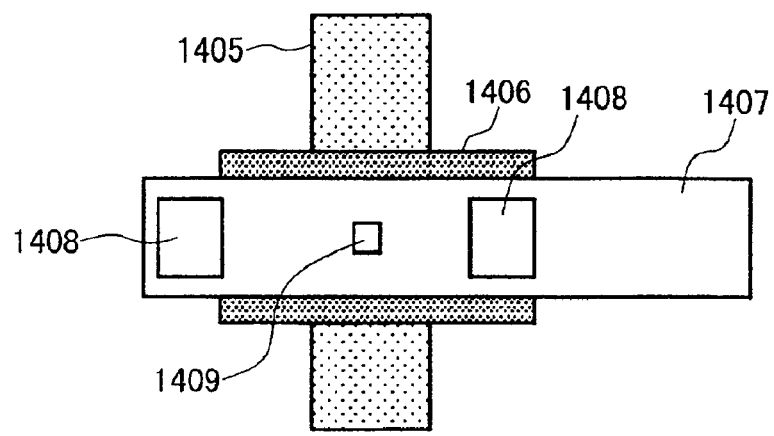
FIGS. 14A, 14B are schematic views of a magnetic memory according to this invention.
Figure 14:
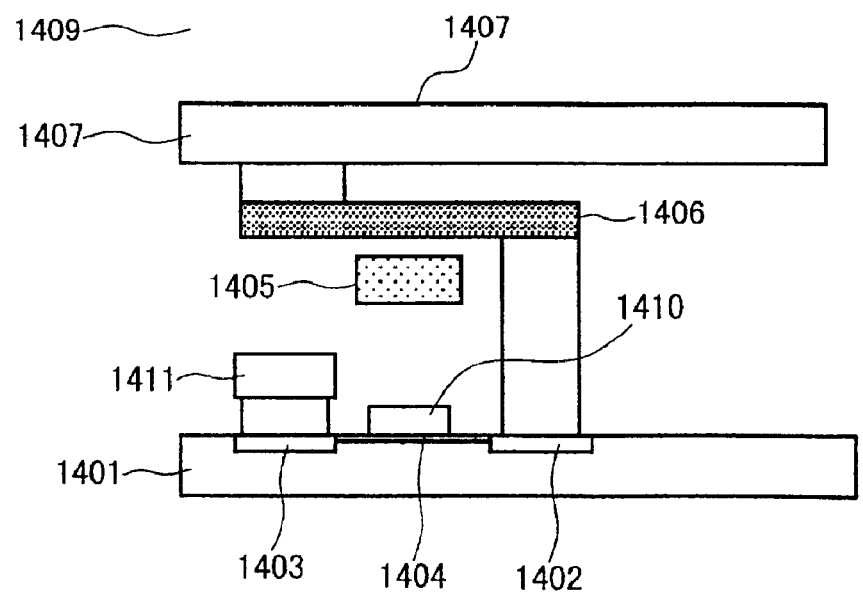

FIGS. 14A, 14B show a typical structure of a magnetic memory, a so-called MRAM. 1401 denotes CMOS as a base member in this case. This is a transistor having terminals referred to as emitter 1403, base 1404 and collector 1402. 1404 denotes a reaction layer formed on a semiconductor substrate through which electrons are conducted.

A magnetic recording element has comprising plural cells arranged in parallel each comprises a structure 1406 having a magnetic sensor 1409 for recording information, and an electrode film structure sandwiching the sensor 1409, a bit line 1407 connected with the magnetic sensor for flowing current to the element, a word line 1405 at a position opposing to the bit line 1407 with respect to the magnetic sensor structure 1406, apart from the magnetic sensor structure 1406 and perpendicular to the bit line for conducting recording operation to the magnetic sensor film, an amplification system for amplifying recording signals and a word line 1411 for conducting switching for reading and writing. In the element, the film of the magnetic sensor 1406 comprises a magnetic sensor containing a magnetic material as shown in Embodiment 1 of the invention. Thus, since the current flows in the direction perpendicular to the film surface or flows in one direction along the film surface. The sensor is used by the same method.

The size of the magnetic sensor element 1409 is from 0.1 to 0.25 $\mu$m for each side in a case where the element is of a square shape. Electron beam lithography was used for fabrication. A film of a structure shown in FIG. 6 or FIG. 7 was adopted for the magnetic sensor film 1409. The periphery of the magnetic sensor film is covered with an insulation film. As the element shape, rectangular, polygonal or circular shape is effective for flowing the current in the vertical direction. In this case, magnetization of the magnetic sensor film is rotated by changing the direction of the synthesis magnetic field generated to a magnetic sensor portion by the direction of current flowing in the word line 1405 and the bit line 1407. When magnetic domain is generated in the free layer upon rotation of the magnetization direction of the free layer of the magnetic sensor film, since the resistance value to the magnetic field fluctuates to lower S/N, the memory can no more be written. For conducting writing at good controllability, a magnetic domain control film is required. When the magnetic domain control film is disposed on both ends of the magnetic sensor structure, the magnetic domain can be controlled with no loss of current leakage to the magnetic domain control film.

In the magnetic memory having thus been constituted, the cell area can be reduced from existent 12F2 to 6–8F2 and the memory capacity can be increased by mounting the magnetoresistive element according to this invention. F means here a minimum fabrication size.

Furthermore, the magnetic head according to the invention has a magnetoresistive element comprising an anti-ferromagnetic layer, a first soft magnetic layer formed on the anti-ferromagnetic layer, a noble-metallic layer formed on the first soft magnetic layer, a half-metallic layer formed on the noble-metallic layer, a spacer formed on the half-metallic layer and a second soft magnetic layer formed on the spacer.

Furthermore, the magnetic head according to the invention has an electrode for flowing current along the direction of a film thickness of the magnetoresistive element.

Furthermore, in the magnetic head according to the invention which has magnetic head, the thickness of the pinned layer is 0.8 nm or more.

Furthermore, in the magnetic head according to the invention, the half-metal is at least one of material formed by adding a transition metal to $Fe_3O_4$, $CrO_2$ or ZnO and a material formed by adding $Mn_2GaN$.

Furthermore, in the magnetic head according to the invention, the spacer contains at least one of Pt, Pd, Rh, Ru, Ir, Au, Ag or Cu.

Furthermore, in the magnetic head according to the invention, the spacer is formed of a non-magnetic and electro-conducting material.

Furthermore, in the magnetic head according to the invention, the first magnetic layer contains CoFe or NiFe.

Furthermore, in the magnetic head according to the invention, noble-metallic layer contains at least one of Pt, Pd, Rh, Ru, Ir, Au or Ag.

Furthermore, in the magnetic head according to the invention, the third magnetic layer contains NiFe.

Furthermore, in the magnetic head according to the invention, the anti-ferromagnetic layer contains a material of one of MnIr, MnPt, CrMnPt or NiO.

Furthermore, in the magnetic head according to the invention, the magnetoresistive element has an area resistance of 2 $\Omega\mu m^2$ or less and a magnetic resistance change coefficient of 2% or more.

Furthermore, in a magnetic read-write device according to the invention which comprises a magnetic recording medium, a driving section for driving the magnetic recording medium, a magnetic head having a magnetoresistive element, an actuator for moving the magnetic head to a predetermined position on the magnetic recording medium, and a signal processing system for regenerating output signals from the magnetic head, the magnetoresistive element comprises a pinned layer containing a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer.

Furthermore, in a magnetic read-write device according to the invention, the magnetic head comprises a reading section and a writing section.

Furthermore, in a magnetic memory according to the invention which has a bit line, a word line perpendicular to the bit line, and a memory cell disposed at the intersection between the bit line and the word line, the memory cell has a stacked film comprising a pinned layer containing a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer.

Furthermore, in the magnetic memory according to the invention which has a bit line, a word line perpendicular to the bit line and a memory cell disposed at the intersection between the bit line and the word line, the memory cell has a stacked film comprising a first magnetic layer, a multi-layered magnetic film having a stacked ferri-structure, and a spacer formed between the first magnetic layer and the multi-layered magnetic layer, in which the multi-layered magnetic film has a second magnetic layer containing a half-metal and formed so as to be in contact with the spacer, a third magnetic layer containing a soft magnetic material, and a noble-metallic layer formed between the second magnetic layer and the third magnetic layer and, further, an anti-ferromagnetic layer is formed on the side of the third magnetic layer opposite to the side formed with the noble-metallic layer.

Furthermore, in a magnetic memory according to the invention which has a bit line, a word line perpendicular to the bit line and a memory cell disposed at the intersection between the bit line and the word line, the memory cell has a stacked film comprising a first soft magnetic layer formed on the anti-ferromagnetic layer, a noble-metallic layer formed on the first soft magnetic layer, a half-metallic layer formed on the noble-metallic layer, a spacer formed on the half-metallic layer and a second soft magnetic layer formed on the spacer.

As apparent from the foregoing descriptions, since the magnetic head according to this invention mounts a magnetoresistive element attaining high magnetic resistance change coefficient or high electric resistance, by adopting a constitution comprising a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer, it has high sensitivity and large output.

Further, the magnetic reading-writing apparatus having the magnetoresistive element can be used in combination with a magnetic recording medium having a surface recording density exceeding 150 $Gb/in^2$.

Furthermore, in the magnetic memory having the magnetoresistive element, the cell area can be reduced from existent 12F2 to 6–8F2 and the memory capacitance can be increased by twice or more compared with usual memories.

The foregoing invention has been described in terms of preferred embodiments. However, those skilled, in the art will recognize that many variations of such embodiments exist. Such variations are intended to be within the scope of the present invention and the appended claims.

What is claimed is:

1. A magnetic head having a magnetoresistive element, comprising:

a pinned layer containing a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer, wherein the half-metal is at least one of a material formed by adding a transition metal to $Fe_3O_4$, $CrO_2$ or ZnO and a material formed by adding $Mn_2GaN$.

2. A magnetic head as defined in claim 1, having an electrode for flowing current along the direction of a film thickness of the magnetoresistive element.

3. A magnetic head as defined in claim 1, wherein the thickness of the pinned layer is 0.8 nm or more.

4. A magnetic head as defined in claim 1, wherein the spacer contains at least one of Pt, Pd, Rh, Ru, In, Au, Ag or Cu.

5. A magnetic head as defined in claim 1, wherein the spacer is formed of a non-magnetic and electro-conducting material.

6. A magnetic head as defined in claim 1, wherein the free layer contains CoFe or NiFe.

7. A magnetic head as defined in claim 1, wherein the noble-metallic layer contains at least one of Pt, Pd, Rh, Ru, Ir, Au or Ag.

8. A magnetic head as defined in claim 1, wherein the soft magnetic layer contains NiFe.

9. A magnetic head as defined in claim 1, wherein the anti-ferromagnetic layer contains a material of one of MnIr, MnPt, CrMnPt or NiO.

10. A magnetic head having a magnetoresistive element, comprising:

a pinned layer containing a half-metal, a free layer formed on one main surface of the pinned layer, a spacer formed between the pinned layer and the free layer, an anti-ferromagnetic layer formed on the main surface of the pinned layer, a soft magnetic layer formed between the pinned layer and the anti-ferromagnetic layer, and a noble-metallic layer formed between the pinned layer and the soft magnetic layer, wherein the magnetoresistive element has an area resistance of 2 $\Omega\mu m^2$ or less and a magnetic resistance change coefficient of 2% or more.

11. A magnetic head having a magnetoresistive element, comprising:

a first magnetic layer, a multi-layered magnetic film having a stacked ferri-structure, and a spacer formed between the first magnetic layer and the multi-layered magnetic layer, in which the multi-layered magnetic film has a second magnetic layer containing a half-metal and formed so as to be in contact with the spacer, a third magnetic layer containing a soft magnetic material, and a noble-metallic layer formed between the second magnetic layer and the third magnetic layer and, further, an anti-ferromagnetic layer is formed on the side of the third magnetic layer opposite to the side formed with the noble-metallic layer, wherein the half-metal is at least one of a material formed by adding a transition metal to $Fe_3O_4$, $CrO_2$ or ZnO and a material formed by adding $Mn_2GaN$.

12. A magnetic head as defined in claim 11, having an electrode for flowing current along the direction of a film thickness of the magnetoresistive element.

13. A magnetic head as defined in claim 11, wherein the thickness of the pinned layer is 0.8 nm or more.

14. A magnetic head as defined in claim 11, wherein the spacer contains at least one of Pt, Pd, Rh, Ru, Ir, Au, Ag or Cu.

15. A magnetic head as defined in claim 11, wherein the spacer is formed of a non-magnetic and electro-conducting material.

16. A magnetic head as defined in claim 11, wherein the first magnetic layer contains CoFe or NiFe.

17. A magnetic head as defined in claim 11, wherein noble-metallic layer contains at least one of Pt, Pd, Rh, Ru, Ir, Au or Ag.

18. A magnetic head as defined in claim 11, wherein the third magnetic layer contains NiFe.

* * * * *